April 13, 1954
R. F. COLLINS
2,675,116
BALE LOADER
Filed July 10, 1950
3 Sheets-Sheet 3
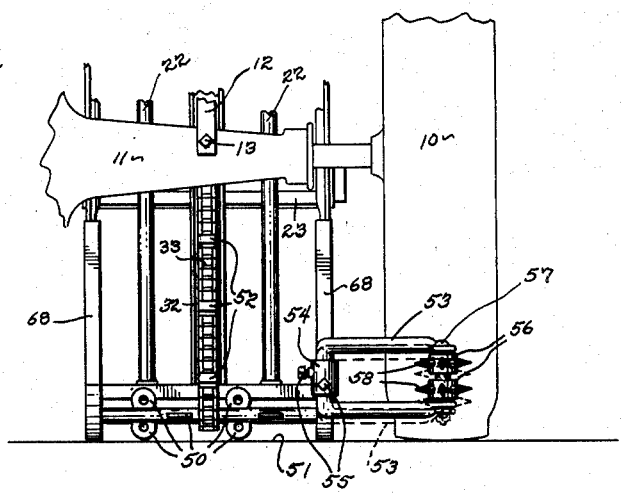
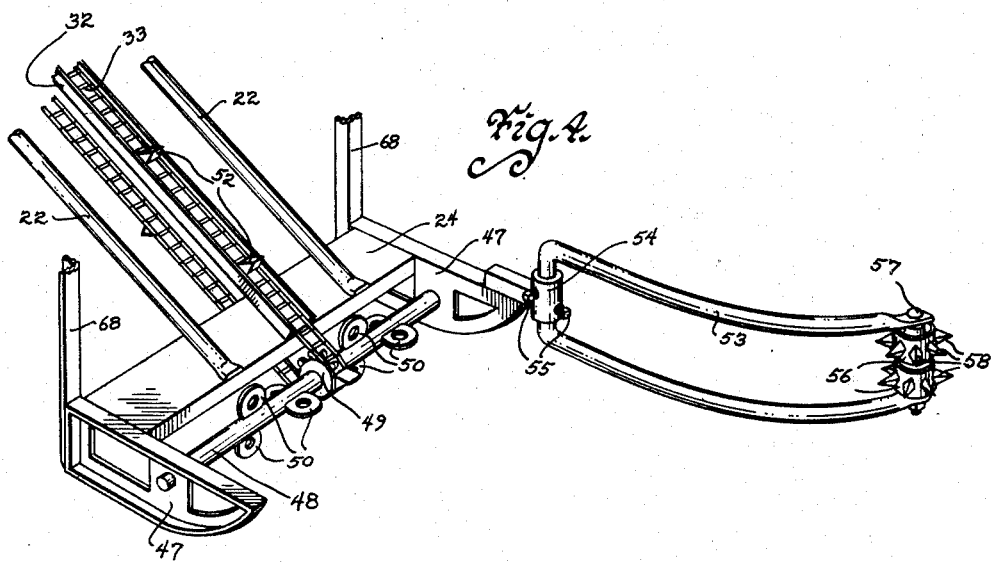
Inventor
Robert F. Collins
by M. Talbert Dick
Attorney
Witness
Edward P. Seely Patented Apr. 13, 1954

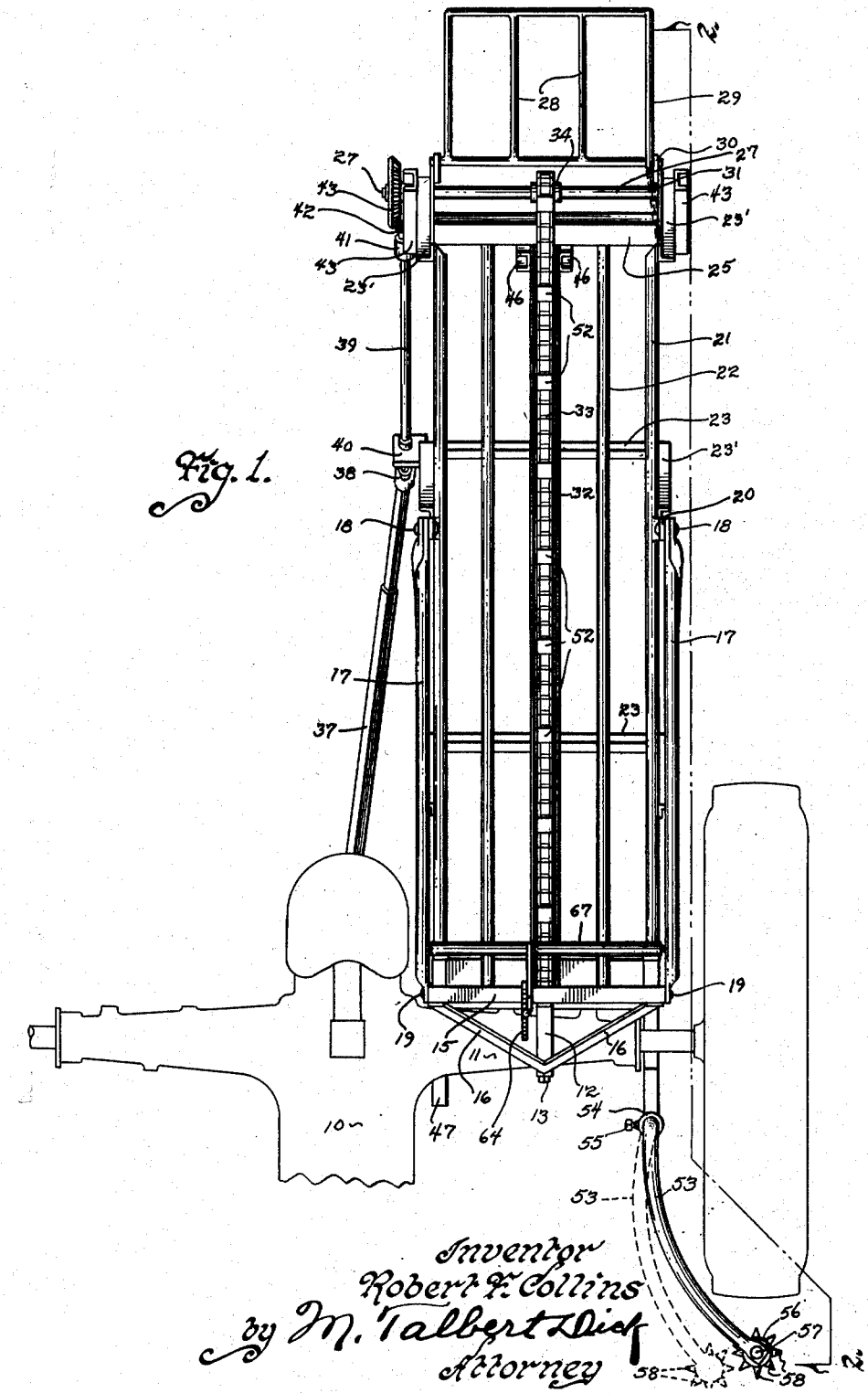

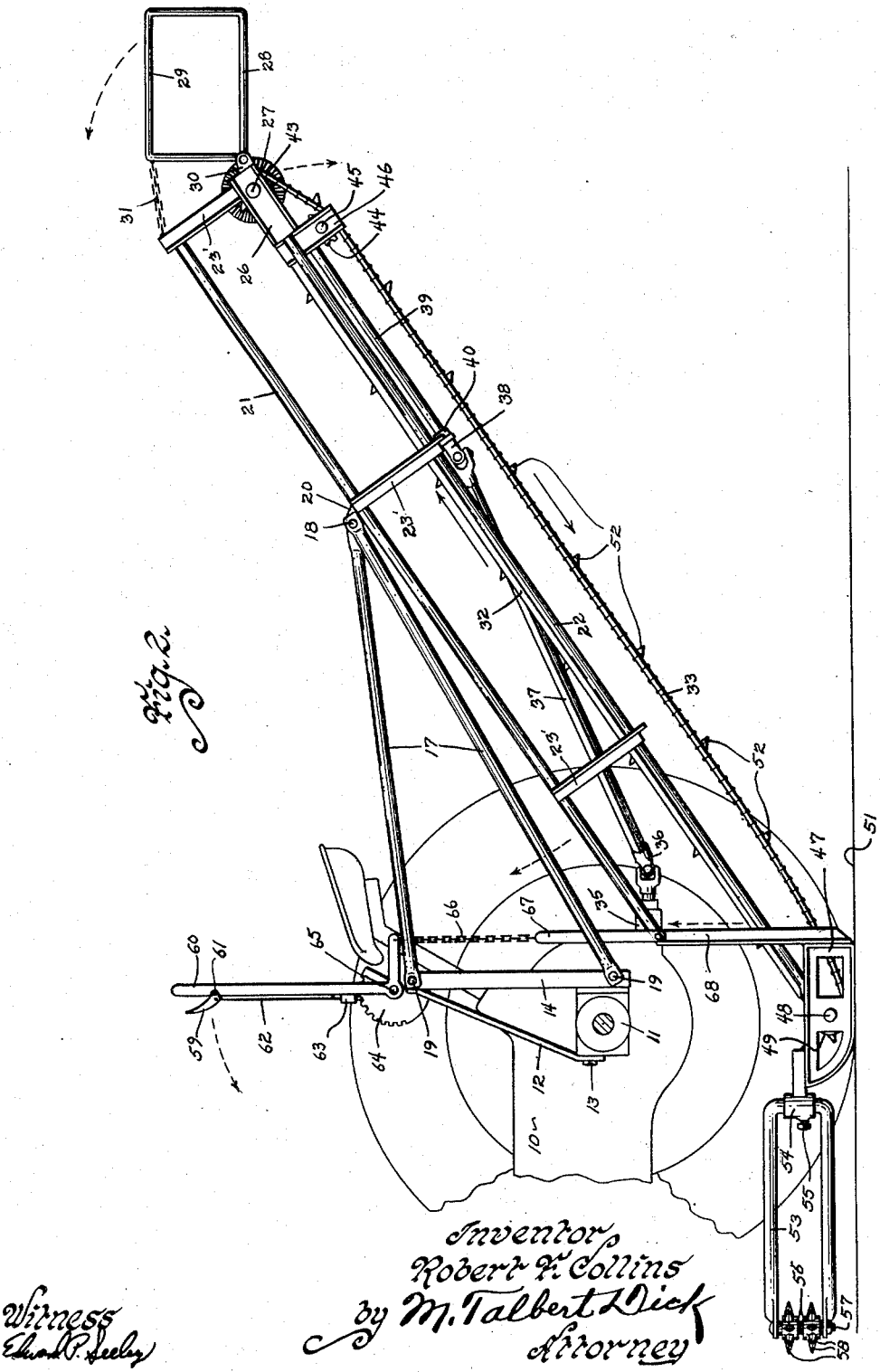

2,675,116

UNITED STATES PATENT OFFICE 2,675,116

BALE LOADER

Robert F. Collins, Seymour, Iowa

Application July 10, 1950, Serial No. 172,931

7 Claims. (Cl. 198—9)

My invention relates to the art of machines for elevating bailed agricultural or other products from a surface on which they may be resting to a predetermined altitude. Specifically I have invented an extraordinarily simple bale elevator and a bale guide that permits the loading of bales by the machine regardless of the altitude assumed by the bale after it is discharged from the baling machine.

As bales of agricultural products emerge from a baling machine whether it is a separate machine or part of a larger combination device, some bales fall flat on one side, others fall on an edge and very occasionally one stands on end. Those that fall on a side are not infrequently disposed at an angle to the line of travel of a bale loading machine and wagon or like conveyance being towed over the field to pick up the bales. In the event a bale is out of alignment, the operator of the loading device is usually faced with a dilemma. Either the operator must maneuver the loading unit considerably or the bale must be straightened to enter the elevator of the loader. To generalize the problem, either more man power is necessary or excessive maneuvering of the equipment is involved. If the bale is on end or on edge and also crosswise to the line of travel of the loader, the difficulties already discussed are multiplied.

Another common shortcoming of field elevator equipment at present is the bulk and awkwardness of many of the devices. The devices are of a design that frequently requires a broad moving endless chain or belt arrangement so that bales failing to enter the device exactly straight may still be elevated. In other elevators a similar end is attempted to be achieved by the use of a plurality of endless elevating elements. While the elevating properties achieved by the use of multiple chains or a wide belt are satisfactory, a rather heavy and awkward structure results. These heavy complex machines are necessarily expensive also.

In view of all these difficulties and shortcomings of the prior art, therefore, it is the principal object of my invention to provide a bale loader that has a single endless conveyor elevating mechanism.

Another object of my invention is to provide a bale loader that is very simple and inexpensive to manufacture.

It is a further object of my invention to provide a bale loader having a guiding element at its forward lower end that permits the proper alignment of bales for entry into the elevator portion of the bale loader.

It is still a further object of my invention to provide a bale loader that has a receiving platform at its upper end.

Still a further object of my invention is to provide a bale loader that is light in weight and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of my bale loader with broken lines illustrating adjustment of the guiding element arm and wheels. A fragment of a supporting and powering automotive vehicle is shown.

Fig. 2 is a side view of my bale loader shown mounted on a fragment of an automotive vehicle and taken on the line 2—2 of Fig. 1.

Fig. 3 is an enlarged front view of the lower forward end of my bale loader and a fragment of a prime mover on which it is mounted. Broken lines illustrate another adjustment of the guiding element arm and wheels.

Fig. 4 is a perspective view of substantially the same portion of my bale loader as shown in Fig. 3 with the automotive vehicle fragments eliminated.

Referring to the drawings I have used the numeral 10 to designate an automotive vehicle such as a tractor or the like which serves both to support the loader and as a source of power to drive the mechanism. The axle housing 11 of the tractor or like has the main pulling brace 12 secured to it by the stud or cap screw 13. Push frame bars 14 are placed behind the axle and are secured together at the top by cross member 15 in any suitable manner as by welding or the like. Main pulling brace 12 is similarly secured to the center of cross member 15. The ends of the cross member are further supported by auxiliary pulling braces 16 that are appropriately secured to the cross member and to main pulling brace 12 near its lower end. A pair of support members designated 17 extend rearwardly from the top and bottom of each push frame bar 14 to hinge points represented by rivets 18. Nut and bolt assemblies could also be used for these hinge points and they are here shown as rivets merely for purposes of showing a preferable form of construction. The forward ends of members 17 are secured in any suitable manner here illustrated as the rivets 19. From the hinge point designated by rivets 18 the major weight of the elevator mechanism is supported by the ears 20 secured in any appropriate way as by welding or the like to side rails 21 which extend for most of the length of the elevator. The bottom of the elevator frame is made of the stringers 22 secured together by being rigidly fastened to the elevator cross connectors 23 in the intermediate section, the shoe plate 24 at the lower forward end and head plate 25 at the top rear. Paling-like uprights designated 23' hold the side rails to the side stringers. These members are secured together in any suitable manner as by welding. Head plate 25 is reinforced at its sides by channel bearing members 26 in which a sub-drive shaft 27 is appropriately journaled. The head platform composed of a base 28 and single side rail 29 is hingedly secured to ears 30 formed on head plate 25. A flexible connection such as chain 31 inhibits movement of the platform in one direction as shown in Fig. 2. The platform receiving basket may be folded on to the elevator frame when the mechanism is not being used as shown by the curved broken-line arrow in Fig. 2. A channel member designated 32 is secured to cross connectors 23 and extends up the center of the frame to provide a support for the endless conveyor 33 which is here shown as a chain. The chain or other endless conveyor element is reeved over an appropriate rotating member such as sprocket 34 secured to shaft 27. The shaft is driven by power from the power take-off 35 of the automotive vehicle 10 operating through universal joint 36 to square slip shaft 37. A second universal joint 38 connects slip shaft 37 to drive shaft 39 that is journaled at its lower end in bearing support 40 and at its upper end in a similar bearing support 41. The small bevel gear 42 is fixed to drive shaft 39 and meshes with the large bevel gear 43 to complete the power transmitting linkage to shaft 27 from the source of power 35 on the automotive vehicle. The chain element is held away from the frame at the top underside by idler sprocket 44 mounted on an idler shaft 45 journaled in a second pair of channel members 46 that are appropriately secured to the headplate. A pair of shoe members 47 are secured at each side of shoe plate 24 and have a second idler shaft 48 journaled between them. A third sprocket 49 engages the chain as it passes over shaft 48 and imparts rotating movement to it. The lifting projections 50 secured to the shaft may be of any suitable shape and are here shown as washers welded to the shaft 48. These washer lifter projections are inexpensive and have proved very satisfactory for getting the end of the bale resting on a surface such as the surface 51 in Figs. 2 and 3 up onto the endless chain flexible conveyor element. Once the lower side of the bale is up to and on the chain the triangular gripping studs 52 carry the bale up the conveyor and deposit it on the receiving basket or platform. It will be noted that the triangular lug gripping studs are arranged so that the slanting surface is carrying the weight of the bale upward. As the chain turns over the drive sprocket the lug gives the bale an extra little push as a result of this arrangement to shove it well onto the receiving platform.

A guiding element bar and wheels arrangement is provided at the forward end of the elevator portion. This guide bar 53 is a U-shaped member adjustably mounted in the collar bracket 54 as shown in Figs. 2 and 3. The bracket is rigidly secured to one shoe member in any appropriate manner as by welding. Two set screws 55 are provided to secure arm 53 in collar bracket 54. Loosening of these screws permits slight vertical adjustment and considerable lateral adjustment. Although one set screw could possibly hold the arm securely two are provided to insure holding against the heavy work the arm is to do and the relatively great leverage applied to the adjustment. The free ends of bar 54 curve laterally as they extend outwardly and hold a pair of rolling star wheel buffer elements 56 between them rotatably mounted in any appropriate way. The preferable form of pivot is here shown as bolt 57. The points 58 of the star wheels are blunt being diamond shape in cross section. This form of guide wheel has proved particularly satisfactory in actual tests. The adjustable character of the guide permits the ready movement of it to the most satisfactory position and serves to make it easily swung to one side when the machine is to be dismounted from the prime mover. Actual field tests demonstrate that the guide element is capable of straightening bales very satisfactorily if they should come to rest with their longitudinal axis disposed transversely to the line of travel of the loader. Bales placed in all altitudes have been successfully picked up with relatively little maneuvering of the loader and prime mover. If the prime mover 10 may be maneuvered enough to cause the points 58 of star wheels 56 to strike the bale the least amount forward of the center of the bail the rotating wheels glide the bale over into the path of the loader and straighten it into the lifting washer projection so that one end is lifted onto the elevating portion of the device.

For transporting the loader from place to place the shoe plate end of the elevator may be raised by pinching trip handle 59 toward the control lever 60. As it hinges on rivet 61 the sector engaging rod 62 is slidably raised through guide 63 and its lower end emerges from a slot in sector 64 to permit the control handle to be hingedly moved in the direction of the broken line arrow in Fig. 2. The control handle pivoting on rivet 65 raises the end of the bell crank arm that is formed integrally with control lever 60. Upward movement, is therefore, imparted to lifting linkage flexible connector chain 66 which in turn moves yoke 67 upward. As the yoke is secured to vertical frame bars 68, the upward movement of the yoke lifts the forward end of the loader above the ground. As the elevator frame is pivoted at rivets 18 when the forward end is lifted, the rear end is lowered as shown by a straight broken line arrow in Fig. 2. The receiving platform may then be folded onto the elevator portion as shown by the curved broken line arrow in Fig. 2 and the loader is ready for transport from field to barn or wherever is desired.

Some changes may be made in the construction and arrangements of my bale loader without departing from the real spirit and purpose of my invention, and it is my intention to cover by my claims, any modified forms of structure or use of mechanical equivalents which may be reasonably included within their scope.

I claim:

1. In a bale loader having an endless conveyor type elevating mechanism and characterized by a guiding assembly secured to the lower forward end of the elevator portion comprising; a collar bracket, a U-shaped guide bar having its free ends curved parallel to each other in a curved plane parallel to the closed end of said U-shaped guide bar; said guide bar being vertically slidably and laterally hingedly adjustably mounted in the collar portion of said collar bracket, a means for fixing said guide bar in said collar at times, and a pair of star wheel roller guide buffers rotatably secured between the free ends of said U-shaped guide bar.

2. In a bale loader having an endless conveyor type elevating mechanism and characterized by a guiding assembly secured to the lower forward end of the elevator portion comprising; a U-shaped guide bar secured to the forward end of said elevator mechanism with its free ends extending forwardly and curving outwardly parallel to each other, a rotating buffer star wheel rotatably mounted between said free ends of said guide bar.

3. In a bale loader having an endless conveyor type elevating mechanism and characterized by a guiding assembly secured to the lower forward end of the elevator portion comprising; a U-shaped guide bar secured to the forward end of said elevator mechanism with its free ends extending forwardly and curving outwardly parallel to each other, a buffer unit rotatably mounted between the free ends of said U-shaped guide bar.

4. In combination with an agricultural bale loader a guide bar device comprising; a mounting brocket capable of being secured to the forward end of the bale loader, a tubular collar portion rigidly secured to said bracket and having its longitudinal axis in a vertical position, a U-shaped arm with its closed end embraced by said collar; said U-shaped arm vertically and hingedly movable with respect to said collar, a releasable means for clamping said U-shaped arm in said collar, and a buffer unit rotatably mounted between the free ends of said U-shaped arm.

5. In combination with an agricultural bale loader a guide bar device comprising; a mounting bracket capable of being secured to the forward end of the bale loader, a tubular collar portion rigidly secured to said bracket and having its longitudinal axis in a vertical position, a U-shaped arm with its closed end embraced by said collar; said U-shaped arm vertically and hingedly movable with respect to said collar, a releasable means for clamping said U-shaped arm in said collar, and a star wheel buffer unit rotatably mounted between the free ends of said U-shaped arm.

6. In a bale loader designed to be supported by an automotive vehicle, a frame, a bale starting lifter rotatably mounted at the forward end of said frame, a shaft rotatably mounted in the rear end of said frame, a sprocket on said bale starting lifter, a second sprocket on said shaft, a channel member extending along said frame between said sprockets, a chain member reeved over said sprockets, lugs secured to said chain in spaced relation to each other the portion of said chain extending between said sprockets on the upper side of said frame lying in and supported by said channel member so that said lugs extend above the top edges of said channel member, a U-shaped guide bar arm vertically and laterally adjustably secured to the forward end of said bale loader, and a buffer unit rotatably mounted between the free ends of said U-shaped guide bar.

7. In a bale loader designed to be supported by an automotive vehicle, a frame, a bale starting lifter rotatably mounted at the forward end of said frame, a shaft rotatably mounted in the rear end of said frame, a sprocket on said bale starting lifter, a second sprocket on said shaft, a channel member extending along said frame between said sprockets, a chain member reeved over said sprockets, lugs secured to said chain in spaced relation to each other the portion of said chain extending between said sprockets on the upper side of said frame lying in and supported by said channel member so that said lugs extend above the top edges of said channel member, a guide bar arm vertically and laterally adjustably secured to the forward end of said bale loader, a bracket collar assembly secured to the forward end of said bale loader with the longitudinal axis of said collar in a vertical position, a U-shaped guide arm with its closed end loosely embraced by said collar; the legs of said U-shaped guide bar extending forwardly and outwardly, a releasable clamping means on said collar for holding said U-shaped guide arm in a fixed position at times, and a pair of star wheel buffer units rotatably secured between the free ends of said U-shaped guide bar.

References Cited in the file of this patent
UNITED STATES PATENTS

| Number | Name | Date |
| --- | --- | --- |
| 1,714,721 | Mojonnier | May 28, 1929 |
| 2,334,304 | Arnett | Nov. 16, 1943 |
| 2,400,086 | Hansen | May 14, 1946 |
| 2,409,143 | McElhinney | Oct. 8, 1946 |
| 2,507,627 | Friedrich | May 16, 1950 |
| 2,586,324 | Graves | Feb. 19, 1952 |
| 2,594,221 | Ryan | Apr. 22, 1952 |
| 2,597,220 | Appel | May 20, 1952 |